(12) United States Patent
Gabler et al.

(10) Patent No.: US 11,401,067 B2
(45) Date of Patent: Aug. 2, 2022

(54) TRAY SEALING MACHINE AND METHOD FOR OPERATING A GRIPPER DEVICE ON THE TRAY SEALING MACHINE

(71) Applicant: MULTIVAC SEPP HAGGENMUELLER SE & CO. KG, Wolfertschwenden (DE)

(72) Inventors: Albert Gabler, Lachen-Albishofen (DE); Peter Buchberger, Waltenhofen (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 281 days.

(21) Appl. No.: 16/865,531

(22) Filed: May 4, 2020

(65) Prior Publication Data
US 2020/0346804 A1 Nov. 5, 2020

(30) Foreign Application Priority Data
May 3, 2019 (DE) .......................... 102019206345.4

(51) Int. Cl.
*B65B 43/46* (2006.01)
*B65B 43/52* (2006.01)
(Continued)

(52) U.S. Cl.
CPC .............. *B65B 35/36* (2013.01); *B65B 43/46* (2013.01); *B65B 43/52* (2013.01); *B65G 47/907* (2013.01)

(58) Field of Classification Search
CPC ......... B65B 35/36; B65B 43/46; B65B 43/52; B65G 47/907; B65G 25/00
(Continued)

(56) References Cited

U.S. PATENT DOCUMENTS 3,890,763 A * 6/1975 Ullman .................. B65D 71/10
53/442
4,974,392 A 12/1990 Mondini
(Continued)

FOREIGN PATENT DOCUMENTS

DE 689 03 016 T2 2/1996
DE 695 05 877 T2 5/1999
(Continued)

OTHER PUBLICATIONS

US 2011/0072764 A1, Daniek et al., Mar. 31, 2011.*
(Continued)

*Primary Examiner* — Douglas A Hess
(74) *Attorney, Agent, or Firm* — Brooks Kushman P.C.

(57) ABSTRACT

A tray sealing machine comprises a gripper device including first and second tray grippers that operate together to take up trays provided by a feed unit and transport them to a sealing station that is downstream in a production direction. A speed of the first and second tray grippers in the production direction when respectively performing a closing motion from a respective initial position toward a respective closing position can be accelerated such that the speed of the first and second tray grippers in the production direction relative to a belt speed of the feed unit during a predetermined first time interval is slower than the belt speed, and during a subsequent predetermined second time interval until the respective closing position has been reached is greater than the belt speed, so that gripper fingers on the first and second tray grippers immerse into respective position windows located between the trays.

16 Claims, 9 Drawing Sheets

(51) Int. Cl.
*B65B 35/36* (2006.01)
*B65G 25/00* (2006.01)
*B65G 47/90* (2006.01)

(58) Field of Classification Search
USPC .................. 414/226.01; 53/299, 302, 329.4
See application file for complete search history.

(56) References Cited

U.S. PATENT DOCUMENTS

| | | | |
|---|---|---|---|
| 5,475,965 | A | 12/1995 | Mondini |
| 9,327,852 | B2 * | 5/2016 | Buchenberg ............ B65B 35/44 |
| 9,376,268 | B2 * | 6/2016 | Schiavina .............. B65G 43/08 |
| 9,650,165 | B2 * | 5/2017 | Gabler .................... B65B 7/162 |
| 10,661,932 | B2 * | 5/2020 | Mader .................... B65B 7/162 |
| 11,155,372 | B2 * | 10/2021 | Hoepner ................. B65B 7/164 |
| 2011/0072764 | A1 | 3/2011 | Daniek et al. |

FOREIGN PATENT DOCUMENTS

| | | |
|---|---|---|
| DE | 10 2009 004 837 A1 | 7/2010 |
| DE | 10 2009 061 006 A1 | 11/2010 |
| EP | 2241862 A2 | 10/2010 |
| EP | 3 269 654 A1 | 1/2018 |
| GB | 2 517 145 B | 2/2015 |
| GB | 2551414 A | 12/2017 |
| WO | 2007/107703 A1 | 9/2007 |

OTHER PUBLICATIONS

US 2011/0308206 A1, Beckel et al., Dec. 22, 2011.*
German Search Report dated Feb. 5, 2020, Applicant No. 10 2019 206 345.4, Applicant Multivac Sepp Haggenmueller SE & Co. KG, 6 Pages.
European Search Report dated Oct. 7, 2020, Applicant No. 20163967.1, Applicant MULTIVAC Sepp Haggenmueller SE & Co. KG, 5 Pages.

* cited by examiner

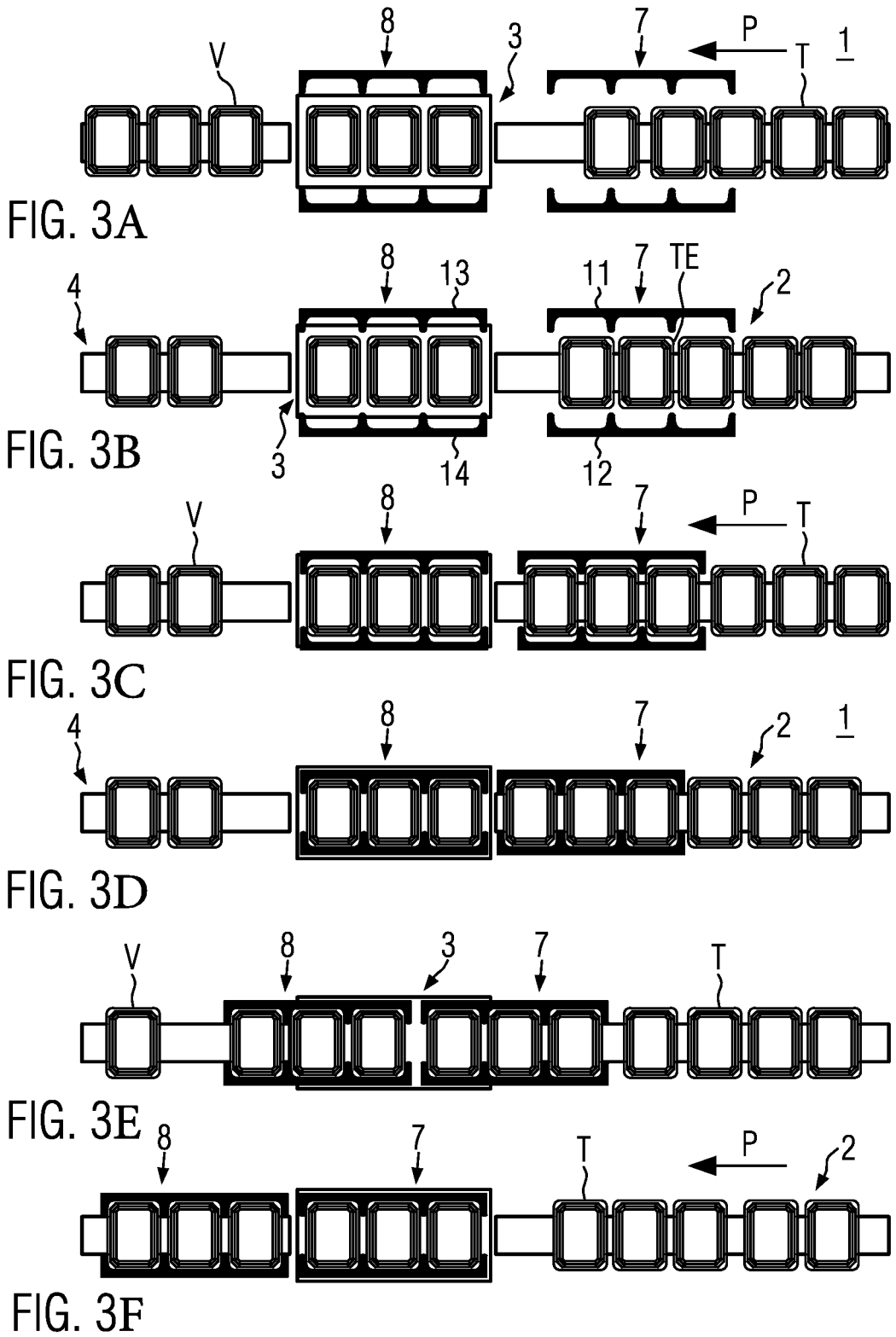

TRAY SEALING MACHINE AND METHOD FOR OPERATING A GRIPPER DEVICE ON THE TRAY SEALING MACHINE

CROSS-REFERENCE TO RELATED APPLICATIONS

This application claims foreign priority benefits under 35 U.S.C. § 119(a)-(d) to German patent application number DE 10 2019 206 345.4, filed May 3, 2019, which is incorporated by reference in its entirety.

TECHNICAL FIELD

The present disclosure relates to a tray sealing machine and to a method for operating a gripper device on a tray sealing machine.

BACKGROUND

GB 25 171 45 B discloses a tray sealing machine, which in practice is also referred to as a tray sealer, with a gripper device that collects trays from a feed belt and supplies them to a sealing station for a tray sealing process taking place therein. After the tray sealing process, the sealed packagings are transported by the gripper device from the sealing station to a discharge belt. The gripper device comprises a first gripper unit for transporting the trays into the sealing station and a second gripper unit coupled thereto for transporting the sealed packagings out of the sealing station towards the discharge belt. The first gripper unit has gripper fingers which are formed to be shorter than gripper fingers which are formed on the second gripper unit. This ensures that sealed packagings standing still can be gripped in advance by way of the extended gripper fingers of the second gripper unit within the sealing station, i.e., before the first gripper unit in the direction of production upstream takes up the trays provided on the feed belt. In other words, an immersion motion of the gripper fingers of the second gripper unit into gaps left free between the packagings there takes place temporally prior to an immersion motion of the gripper fingers of the first gripper unit into gaps left free between the trays.

However, a disadvantage of the above-described procedure is that the stroke working transversely to the direction of production for closing and opening the gripper device requires a comparatively long length of stroke due to the extended gripper fingers of the second gripper unit. As a result, the stroke motion time in every transport cycle is also longer, which can reduce productivity.

SUMMARY

An object of the disclosure, in particular against the background of the known solution described above, is to provide a tray sealing machine as well as a method for operating a gripper device on a tray sealing machine with which the productivity of the tray sealing machine can be raised while still ensuring precise tray transport.

This object is satisfied with a tray sealing machine according to the disclosure and with a method for operating a gripper device on a tray sealing machine according to the disclosure.

Advantageous developments of the disclosure are specified in the respective dependent claims.

The disclosure relates to a tray sealing machine comprising at least one feed unit for transporting trays in a direction of production, a sealing station in the direction of production downstream of the feed unit for the production of packagings, at least one discharge unit in the direction of production downstream of the sealing station, as well as a gripper device. The gripper device is configured to take up trays provided in a transport cycle at the feed unit and transport them to the sealing station for a tray sealing process taking place therein, as well as to take up packagings produced within the sealing station and transport them to the discharge unit.

The gripper device comprises a first gripper unit with a first and a second tray gripper, where the first and the second tray gripper are mounted synchronously to each other periodically adjustable along closed trajectories, and where the first and the second tray grippers are configured to perform a closing motion (hereinafter also referred to as immersion motion) for taking up the trays provided by the feed unit. The first and the second tray gripper are each adjustable when performing the closing motion from a respective initial position toward a respective closing position, where the first and the second tray gripper are adjustable toward each other during the closing motion, at least along a predetermined motion section until the closing position has been reached, by way of a motion superimposed both in the direction of production as well as transverse to the direction of production in order to take up the trays provided at the feed unit, where the trays provided on a conveyor belt of the feed unit are arranged consecutively in the direction of production at a predetermined distance from each other which defines a respective position window between the trays.

Characteristic of an embodiment of the disclosure is that the first gripper unit is configured such that a speed of the first and the second tray gripper in the direction of production when respectively performing the closing motion from the respective initial position toward the respective closing position can be accelerated such that the speed of the first and the second tray gripper in the direction of production relative to a belt speed of the feed unit, which is greater than zero, during a predetermined first time interval of the predetermined motion section is slower than the belt speed and during a subsequent predetermined second time interval until the closing position has been reached is greater than the belt speed, so that the gripper fingers formed on the first and the second tray gripper immerse into the respective position windows located between the trays provided, each along a predetermined trajectory section, which, for example, opens parabolically in the direction of production.

According to the disclosure, the closing motion, in particular the associated predetermined trajectory section, may relate primarily to an immersion motion of the gripper fingers formed on the first gripper unit into the position windows left free between the trays on the conveyor belt of the feed unit. Prior to the immersion motion being performed, the first gripper unit can already have been closed, except for a predetermined degree, according to a preceding, start-up section of the closing motion, for example, from a starting position up to the initial position of the tray grippers, in order to position the respective tray grippers approached to the trays, in particular in their respective initial positions, for the subsequent closing motion for the immersion of the gripper fingers into the position windows. The executable start-up motion of the tray grippers, which is preceded by the immersion motion, can take place exclusively transverse to the direction of production or with a superimposed motion in as well as transverse to the direction of production. It would also be conceivable that the start-up section has a motion component that is oriented against the direction of production.

In particular, a front region of the position windows, i.e., in the direction of production at the rear tray corners, can be selected as the respective initial position for the immersion process, in order to position the respective gripper fingers for the closing motion, i.e., their immersion process. The respective gripper fingers of the first gripper unit can therefore immerse into the position windows provided for their immersion motion, which are present between the trays at the feed unit, first in the direction of production at a front region of the respective position windows and carefully, with a relative speed that is slower than the conveyor belt, enter along the predetermined trajectory section into the position windows until a predetermined immersion depth has been reached, at which the gripper fingers already protrude into the position windows. Since the speed of the conveyor belt of the feed unit at the beginning of the immersion motion of the first gripper unit is greater than the speed of the respective tray grippers in the direction of production, the trays provided on the conveyor belt of the feed unit, in particular the position windows left free therebetween into which the gripper fingers are to immerse, initially pass the first and the second tray gripper in such a way that, at the beginning of the immersion motion in a relative perspective, the gripper fingers, starting out from their initial positions, can immerse in a reversing manner and slowly into the position windows that were left free, before a sufficiently deep position (the above-mentioned predetermined immersion depth) of the gripper fingers between the trays has been reached. From this point in time, the tray grippers can be accelerated beyond a magnitude of the conveyor belt speed in order to gently and quickly carry along the trays in the direction of production. Gentle take-up can be supported in that the tray grippers take up the trays at the conveyor belt speed.

The closing motion performed may therefore result in that the trays transported on the conveyor belt of the feed unit at a belt speed are carefully and precisely taken up in the motion flow and can be transported onward with a fast and nevertheless gentle transport in the direction of production to the downstream sealing station.

The trajectory section intended for the immersion of the gripper fingers during their closing motion can comprise a first inclination section, which is negative from the initial position of the gripper fingers up to a predetermined immersion depth of the gripper fingers into the position windows, and a second inclination section following the first inclination section up to the closing position which is positive. The trajectory section can have a substantially parabolic shape that opens in the direction of production.

Particularly, when performing the closing motion for taking up trays by way of the first gripper unit, a motion of the first and the second tray gripper formed thereon in the direction of production and transverse to the direction of production as well as an advance motion of the conveyor belt of the feed unit are continuously superimposed when the gripper lingers immersed into the position windows. The respective motions of the two tray grippers in and transverse to the direction of production as well as the motion of the conveyor belt of the feed unit can in principle be matched to each other in terms of control systems such that the immersion of the gripper fingers starting out from their initial position when performing the closing motion can be precisely coordinated carefully up to a predetermined immersion depth and subsequently, by accelerating the tray gripper beyond the speed level of the conveyor belt, is accompanied by a rapid but gently performable entertainment motion for transporting trays to the sealing station. In terms of control technology, a control device provided separately for the gripper device at the tray sealing machine and/or a central control device of the tray sealing machine can be used for this purpose.

An advantageous embodiment of the disclosure provides that the respective gripper fingers are adjustable during the performance of the closing motion, at least during the first time interval, in a noncontact manner toward the trays along the respective trajectory sections within a region of the respective position windows. Due to the superimposed motions, the gripper fingers of the first gripper unit can immerse into the respective position windows, at least during the first time interval of the immersion motion within the position windows, in opposite direction to the trays, because the position windows are initially adjusted in the direction of production faster than the tray grippers, where the tray transport can move on continuously.

It is advantageous to have the respective initial position of the first and the second tray gripper be defined in such a way that the respective tips of oppositely disposed gripper fingers are moved in the direction of production to the rear tray corners of a tray and are positioned in the direction of production at the front of the subsequent position window before the closing or immersion motion begins. Relative to the trays, the gripper fingers can immerse carefully into the respective position windows carefully from the rear tray corners as well as with a maximum immersion distance running opposite to the faster tray motion.

In the direction of production downstream of the first gripper unit, the gripper device may comprise a second gripper unit with a third and a fourth tray gripper, where the third and the fourth tray gripper are mounted synchronously to each other periodically adjustable along closed trajectories, where the third and the fourth tray gripper of the second gripper unit are configured to perform a closing motion for taking up the packagings produced in the sealing station, where the third and the fourth tray gripper are each adjustable when performing the closing motion from a respective initial position toward a respective closing position, it is possible by way of the second gripper unit to take up the sealed packagings that were completed within the sealing station and transfer them to the discharge unit downstream of the sealing station. The closing motion here as well is an immersion motion of gripper fingers formed on the third and fourth gripper unit into the respective gaps between the packagings in the sealing station.

A more advantageous variant provides that the first and the second gripper unit are formed coupled to each other, so that the respective tray grippers are adjustable on common trajectories. With such an integrally formed solution for the gripper device, the complexity in control technology at the tray sealing machine can be reduced.

Alternatively, it can be advantageous to have the first and the second gripper unit be formed as separate gripper units. Here, both the operation and the structural configuration of the two gripper units could be made more independent of each other.

According to one variant, gripper fingers respectively provided on the first and the second gripper unit for gripping the trays or packagings, respectively, are formed to be equally long transverse to the direction of production.

In particular where separate gripper units are present, a special embodiment provides that the third and the fourth tray gripper of the second gripper unit are configured to perform a release motion for the release of produced packagings to the discharge unit, where the third and the fourth tray gripper are adjustable, at least along a motion section during the release motion, by way of a motion superimposed both in the direction of production and against the direction of production in order to release the packagings for onward transport to a conveyor belt of the discharge unit running in the direction of production. This can reduce downtimes of the conveyor belt of the discharge unit.

When performing the release motion, the third and the fourth tray gripper of the second gripper unit are each preferably adjustable with a motion component in the direction of production which is synchronized to a motion component of the packagings transported away in the direction of production by the discharge unit. This allows for the respective gripper lingers of the second gripper unit to be carefully moved out of an engagement region between the packagings produced, so that the packagings produced can be transferred precisely in position to the conveyor belt of the discharge unit. This makes it easier to carry Out further processing, such as labelling, of the packagings produced.

An advantageous embodiment of the disclosure provides that the first gripper unit is configured to perform a return motion to the respective starting position of the closing motion and/or to the initial position of the immersion motion, where the respective first and the respective second tray gripper are adjustable toward each other during the return motion, at least along a motion section until the starting and/or initial position has been reached, by way of a motion superimposed both against the direction of production and transvers to the direction of production. This achieves that the respective tray grippers of the first gripper unit are adjustable comparatively quickly from the sealing station back to their starting and/or initial position, in order to again be available from this position for a closing motion for gripping trays that are provided on the conveyor belt of the feed unit.

The disclosure also relates to a method for operating a gripper device on a tray sealing machine.

In the method according to the disclosure, trays from a feed unit are taken up by a first gripper unit and transported into a sealing station for a tray sealing process. For taking up the trays provided by the feed unit, a first and a second tray gripper of the first gripper unit perform a closing motion with which the tray grippers are adjusted from a respective initial position toward a respective closing position, where the first and the second tray gripper during the closing motion are adjusted toward each other, at least along a predetermined motion section until the closing position has been reached, by way of a motion superimposed both in the direction of production as well as transverse to the direction of production in order to take up the trays provided at the feed unit. The trays are provided on a conveyor belt of the feed unit consecutively in the direction of production at a predetermined distance from each other which defines a respective position window between the trays.

Characteristic of the method according to the disclosure is that a speed in the direction of production of the first and the second tray gripper when respectively performing the closing motion, i.e., during an immersion motion of gripper fingers formed thereon between the trays, is accelerated from the respective initial position toward the respective closing position such that the speed of the first and the second tray gripper in the direction of production relative to a belt speed of the feed unit, which is greater than zero, during a predetermined first time interval of the predetermined motion section is slower than the belt speed and during a subsequent predetermined second time interval until the closing position has been reached is greater than the belt speed. Gripper fingers formed on the first and the second tray gripper starting out from their respective initial position can thus each perform an immersion motion into the respective position windows between the trays provided, each along a predetermined trajectory section in the direction of production.

According to the disclosure, the conveyor belt used at the feed unit is therefore moved faster during the closing motion than the respective tray grippers in the direction of production, in particular at the beginning of the immersion motion of the respective tray grippers. This has the consequence that the position windows left free between the respective trays pass the respective gripper fingers of the two tray grippers for a predetermined time each moving transverse to and in the direction of production and the superimposed sequence of motion of the tray grippers can be coordinated with the belt speed in such a manner that the gripper fingers starting out from their initial positions immerse in a noncontact manner into the position windows left free between the trays within the position windows in the direction opposite to the direction of production, which takes place up to a point in time when the gripper fingers are immersed sufficiently deep into the respective position windows. When a sufficient immersion depth has been reached, the tray grippers can be further accelerated in the direction of production in order to be moved along at a speed level above that of the belt speed, whereby the trays can be taken along by the conveyor belt of the feed unit in the direction of production to the sealing station.

The respective gripper fingers of the first gripper unit preferably immerse into the position windows provided for their immersion motion, which are present between the trays at the feed unit, first in the direction of production at a front region of the respective position windows beside rear tray corners and move in opposite direction and carefully, with a relative speed that is slower than the conveyor belt, along the predetermined trajectory section into the position windows until a predetermined immersion depth has been reached. Since the speed of the conveyor belt of the feed unit at the beginning of the immersion motion of the first gripper unit is greater than the speed of the respective tray grippers in the direction of production, the trays provided on the conveyor belt of the feed unit, in particular the position windows left free therebetween into which the gripper fingers are to immerse, initially pass the first and the second tray gripper in such a way that, in a relative perspective, the gripper fingers, starting out from their initial positions, immerse and in a reversing manner and slowly into the position windows that were left free, before a sufficiently deep position (the above predetermined immersion depth) within the positions windows between the trays has been readied. From this point in time, the tray grippers can be accelerated beyond a magnitude of the conveyor belt speed in order to gently and quickly carry along the trays in the direction of production. Gentle take-up can be supported in that the tray grippers take up the trays at the conveyor belt speed.

It is advantageous when performing the closing motion for taking up trays by way of the first gripper unit, that a motion of the first and the second tray gripper formed thereon in the direction of production and transverse to the direction of production as well as an advance motion of the conveyor belt of the feed unit are continuously superimposed. The trays can thus be taken up particularly precisely and gently by the first gripper unit and can be transported into the sealing station for a subsequent tray sealing process.

A second gripper unit in the direction of production downstream of the first gripper unit preferably takes up packagings produced in the sealing station and transfers them to a discharge unit that is in the direction of production downstream of the sealing station, where a third and a fourth tray gripper of the second gripper unit perform a closing motion for taking up the packagings produced in the sealing station, and where the third and the fourth tray gripper when performing the closing motion are each adjusted from a respective initial position toward a respective closing position. The first and the second gripper unit can be used excellently for automated operation of the tray sealing machine.

A particularly compact and advantageous solution in terms of control technology provides that the first and the second gripper unit perform the respective closing motions coupled to each other, so that the third and the fourth tray gripper are adjusted toward each other during, the closing motion of the second gripper unit, at least along a motion section until the closing position has been reached, by way of a motion superimposed both in the direction of production as well as transverse to the direction of production to take up the packagings provided in the sealing station.

The third and the fourth tray gripper are preferably configured in such a way that the packagings provided within the sealing station maintain their respectively assumed positions at which they are positioned for collection, until the third and the fourth tray gripper have arrived in the respective closing position.

The third and the fourth tray gripper of the second gripper unit preferably perform a release motion for a release of packagings produced to the discharge unit, where the third and the fourth tray gripper are adjusted during the release motion, at least among a motion section, by way of a motion superimposed both in the direction of production as well as in the opposite direction transverse to the direction of production in order to transfer the packagings for onward transportation to a conveyor belt of the discharge unit running in the direction of production. This reduces downtimes of the conveyor belt that is part of the discharge unit, so that the overall flow of production can be conducted in a more continuous manner.

When performing the release motion, the third and the fourth tray gripper of the second gripper unit are each preferably adjusted with a motion component in the direction of production which is synchronized with a motion component of the packagings transported away in the direction of production by the discharge unit. This allows the gripper fingers formed on the respective tray grippers of the second gripper unit to be moved out so carefully from an immersion region between the packagings produced that the packagings can be precisely transferred with predetermined spacings to the conveyor belt of the discharge unit. Further processing and onward transportation of the packagings delivered in this way is then easier to perform.

The principle according to the disclosure can also be used excellently on a multiple lane tray sealing machine. The gripper device employed in the disclosure could then be realized by way of several tray gripper units operating in parallel in order to take up trays cyclically according to a machine cycle or optionally in a temporally offset manner from feed units that are arranged in the direction of production parallel to each other and transport them to the respective downstream sealing stations.

BRIEF DESCRIPTION OF THE DRAWINGS

Embodiments of the disclosure shall be explained on the basis of the following figures, where:

FIGS. 3A to 3I show an embodiment with separate gripper units;

Technical features in the figures are provided throughout with the same reference signs.

DETAILED DESCRIPTION

Figure 1:
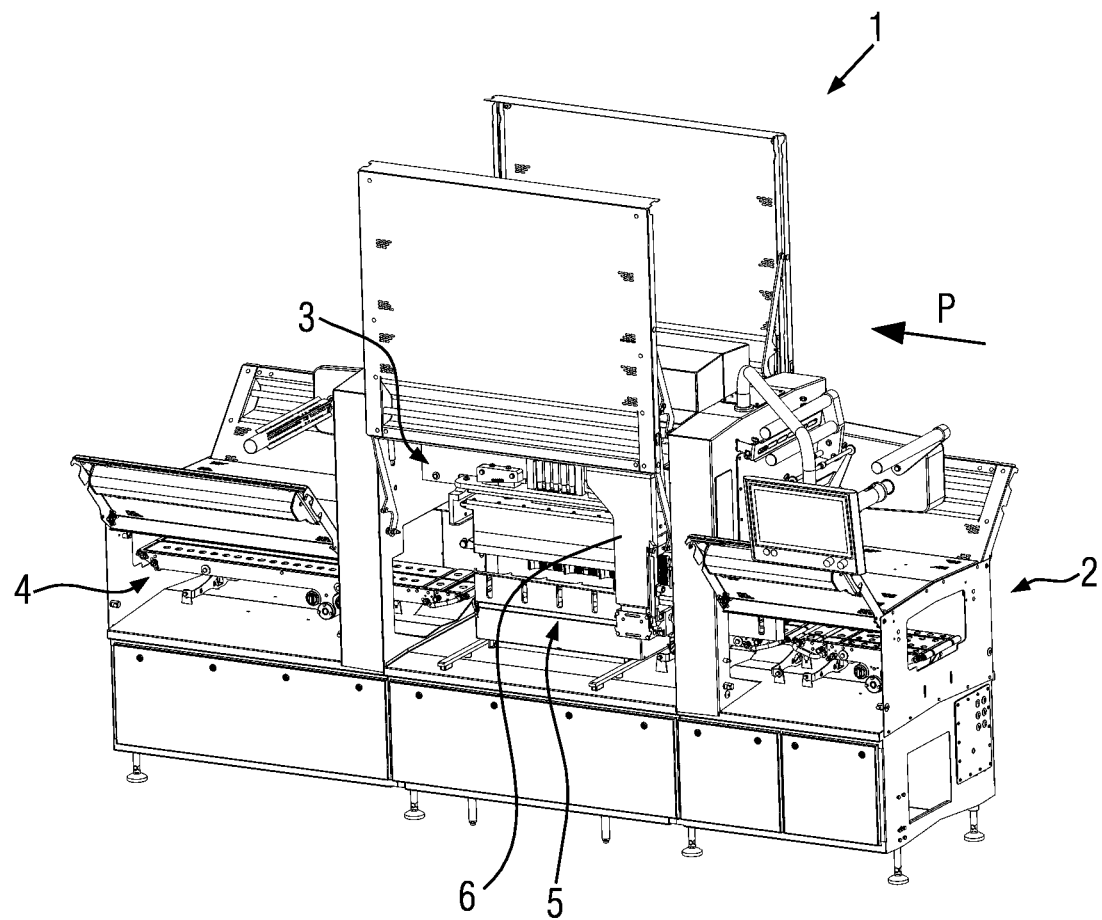
FIG. 1 shows a packaging machine that is present in the form of a tray sealing machine.

FIG. 1 shows a tray sealing machine 1. Tray sealing machine 1 is configured as a so-called tray sealer. Tray sealing machine 1 comprises a feed unit 2 for transporting trays 1 in a direction of production P, where trays are shown, for example, in FIG. 2A. In direction of production P, a sealing station 3 for the production of packagings V is disposed downstream of feed unit 2. Packagings V are produced by a tray sealing process S according to FIG. 2*a* within sealing station 3.

Furthermore, FIG. 1 shows a discharge unit 4 in direction of production P downstream of sealing station 3 for transporting away packagings V produced. Tray sealing machine 1 from FIG. 1 furthermore has a gripper device 5 which is formed to take up trays provided in a transport cycle at feed unit 2 and to transport them into sealing station 3 for tray sealing process S taking place therein. In addition, gripper device 5 is configured to take up packagings V produced within sealing station 3 and transport them to discharge unit 4. Gripper device 5 on both sides of sealing station 3 has a gripper arm 6 as well as pairs of tray grippers attached to gripper arms 6 for taking up and transporting trays T as well as packagings V. The pairs of tray grippers are explained in more detail in the context of the following figures.

FIGS. 2A to 2F show in schematic representation an operating sequence of a gripper device 5 on tray sealing machine 1 from FIG. 1.

Figure 2A:
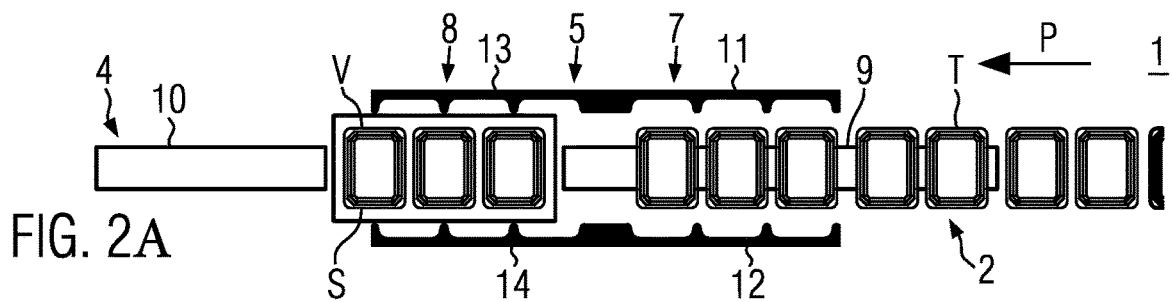
FIGS. 2A to 2F show an embodiment of the disclosure with an integrally formed gripper device.

According to FIG. 2A, gripper device 5 comprises a first gripper unit 7 and a second gripper unit 8 which are formed coupled to each other. First gripper unit 7 is configured to take up trays T from a conveyor belt 9 of feed unit 2 and to transport them to sealing station 3 for tray sealing process S. Second gripper unit 8 is configured to take up sealed packagings V which have been produced within sealing station 3 and to deliver them to a conveyor belt 10 of discharge unit 4 disposed in direction of production P downstream of sealing station 3. As shown in the following FIGS. 2B to 2F, by transporting trays T by way of gripper device 5 into sealing station 3, sealed packagings V are transported at the same time from sealing station 3 to discharge unit 4.

FIG. 2A also shows that first gripper unit 7 comprises a first tray gripper 11 and a second tray gripper 12. Second gripper unit 8 comprises a third tray gripper 13 and a fourth tray gripper 14. First and the second tray gripper 11, 12 form a pair of tray grippers for transporting trays and third and fourth tray grippers 13, 14 form another pair of tray grippers for transporting sealed packagings V.

Figure 2B:
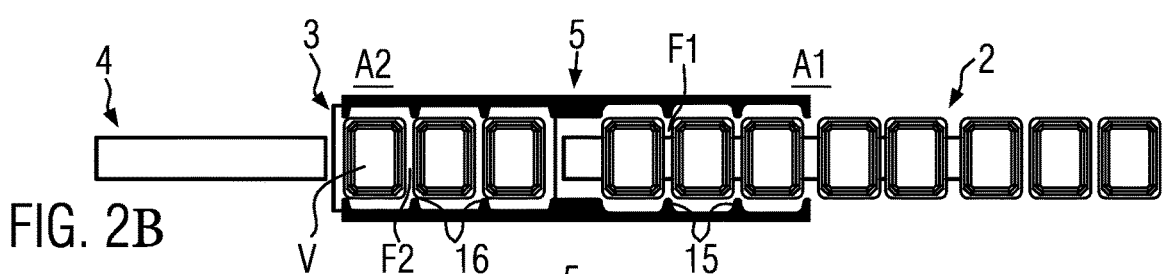

In comparison to FIG. 2A, the respective pairs of tray grippers are shown in FIG. 2b to as being moved closer together. Position windows F1 are left free between trays T provided on conveyor belt 9 of feed unit 2. Gripper fingers 15 formed on first gripper unit 7 are positioned directly next to position windows F1. FIG. 2B also shows that gripper fingers 16 formed on second gripper unit 8 are positioned within sealing station 3 directly next to position windows F2 which are present between finished and sealed packagings V.

First and second gripper unit 7, 8 are each positioned in FIG. 2B in such a way that the pairs of tray grippers formed thereon in a respective initial position A1, A2 are mounted in relation to trays T on feed unit 2 and in relation to packagings V within sealing station 3.

Figure 2C:
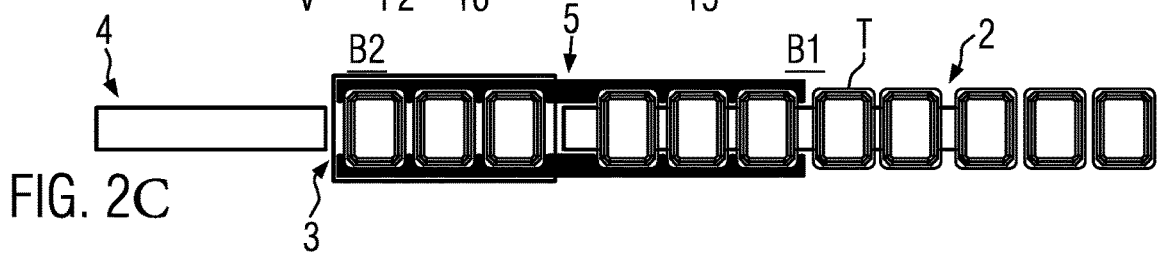

FIG. 2C shows first gripper unit 7 as well as second gripper unit 8 in respective closing positions B1, B2. Respective gripper fingers 15, 16 of first and the second gripper unit 7, 8 are shown in FIG. 2C immersed in respective position windows F1, F2. Trays T as well as packagings V are now gripped at gripper device 5 for their respective onward transportation.

Figure 2D:
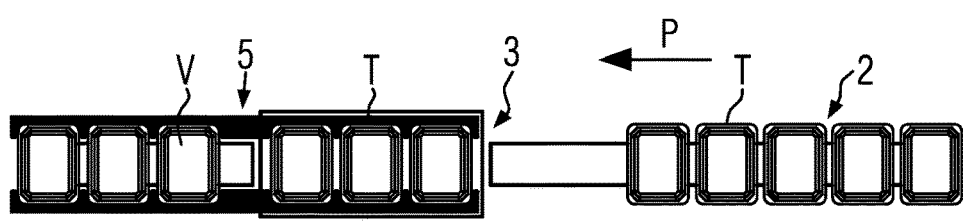

Trays T collected according to FIG. 2C at feed unit 2 are transported in FIG. 2D from first gripper unit 7 into sealing station 3 and sealed packagings V are transferred by second gripper unit 8 from sealing station 3 to discharge unit 4. Trays T are already provided on feed unit 2 for a new transport cycle.

Figure 2E:
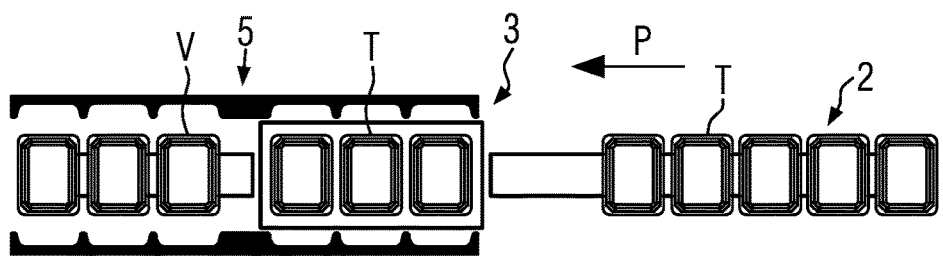

It is shown in FIG. 2E that the respective pairs of tray grippers of first and the second gripper unit 7, 8 have distanced themselves from trays T transported into sealing station 3 as well as from sealed packagings V delivered to discharge unit 4. First and the second gripper unit 7, 8 are now positioned in such a way that they can perform a return motion against direction of production P to their respective initial positions A1, A2.

Figure 2F:
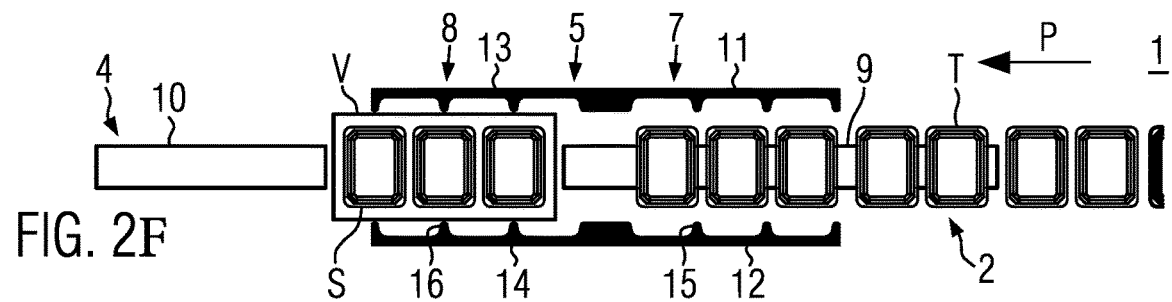

In FIG. 2F, gripper device 5 is again positioned like in FIG. 2A, so that the transport cycle of trays T as well as packagings V can start anew.

Figure 2G:
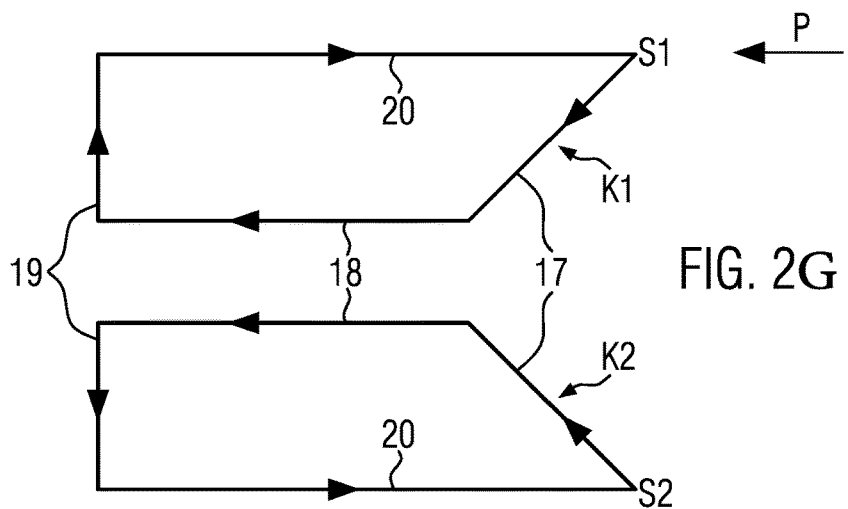
FIG. 2G shows a schematic motion sequence of the embodiment according to FIGS. 2A to 2F.

FIG. 2G shows in schematic representation the principle of the motions of gripper device 5 performed in FIGS. 2A to 2F. Gripper device 5 according to FIG. 2G moves substantially along closed trajectories K1, K2. Respective trajectories K1, K2 show a closing section 17, a transfer section 18, a release section 19 and a return section 20. The starting orientation of gripper device 5 shown in FIG. 2a is illustrated in trajectories K1, K2 in FIG. 2F at location S1, S2. FIGS. 3A to 3I show an embodiment in which gripper device 5 is equipped with a separate first and a separate second gripper unit 7, 8. Furthermore, first gripper unit 7 is formed to transport trays T and second gripper unit 7, 8 to transport sealed packagings V.

First and second gripper unit 7, 8 are shown in FIG. 3A in respective open states.

In FIG. 3B, respective tray grippers 11, 12 and 13, 14 of first and second gripper unit 7, 8 are moved closer to trays T as well as to packagings V. In direction of production P, respective gripper fingers 15 of first gripper unit 7 are approached close to respective rear tray corners TE, directly adjacent to a front region of position windows F1.

FIG. 3C shows a continuation of the respective closing motions of first and second gripper unit 7, 8. Gripper fingers 15 provided on first gripper unit 7 now immerse almost entirely into respective position windows F1. Respective gripper fingers 16 formed on second gripper unit 8 immerse into respective corresponding, position window F2 between packagings V positioned within sealing station 3.

FIG. 3D shows separately formed gripper units 7, 8, each in the closing position.

FIG. 3E shows the onward transportation of sealed packagings V by second gripper unit 8 and the simultaneous supply of new trays T to be sealed by first gripper unit 7 in direction of production P.

The beginning of a dispensing process of completed packagings V to discharge unit 4 by second gripper unit 8 as well as the supply of trays T by first gripper unit 7 into sealing station 3 is shown in FIG. 3F.

Figure 3J:
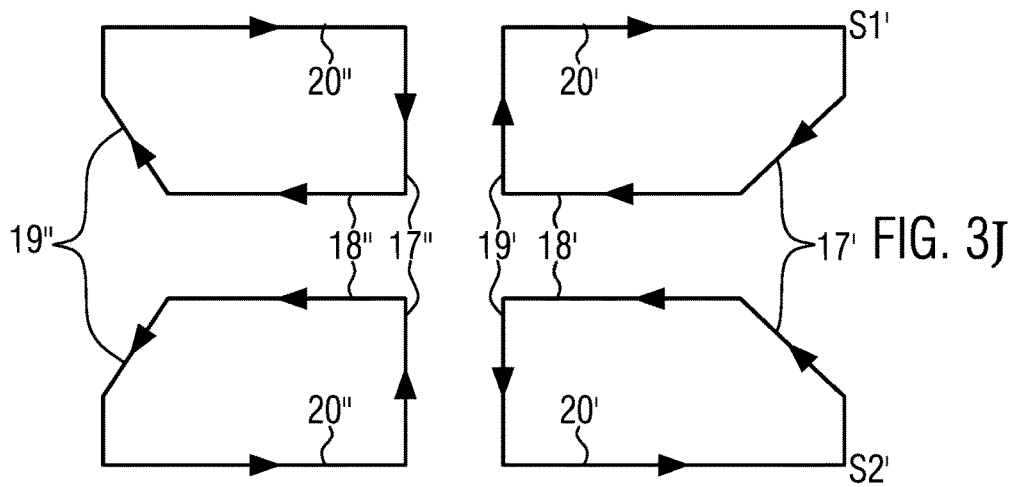
FIG. 3J shows a schematic motion sequence of the gripper units from FIGS. 3A to 3I.
Figure 3G:
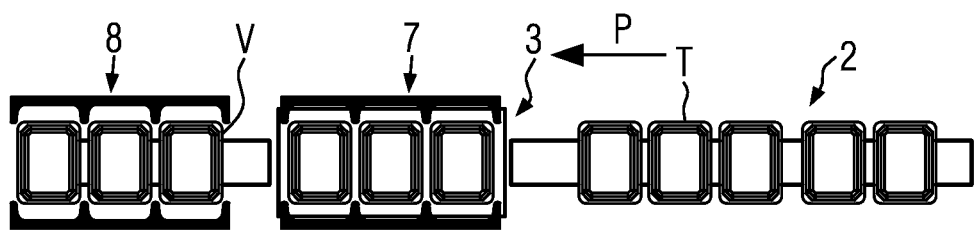
Figure 3H:
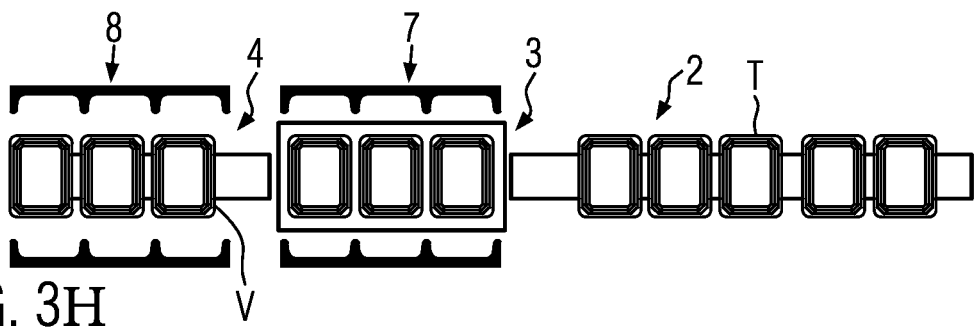
Figure 3I:
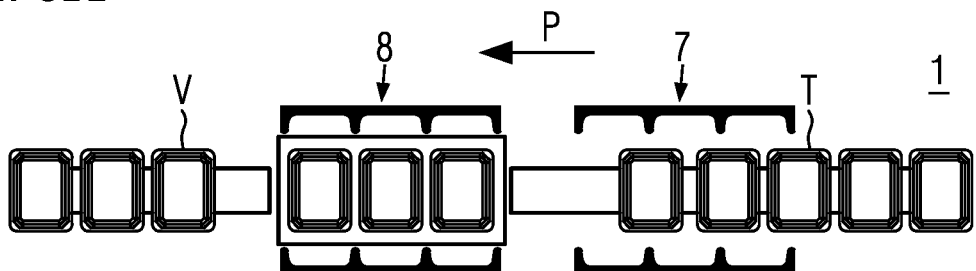

According to FIGS. 3G and 3H, first and second gripper unit 7, 8 are opened to return a respective return motion to the position of the two gripper units 7, 8 shown in FIG. 3I. In FIG. 3I, respective gripper units 7, 8 have again arrived in their starting position according to FIG. 3A, so that the tray or packaging transport can begin anew.

FIG. 3J shows respective schematic pairs of trajectories for the operation of first and second gripper unit 7, 8 according to FIGS. 3a to 3i. Starting out from respective starting positions S1', S2', the respective pairs of tray grippers of first and the second gripper unit 7, 8 with respect to FIG. 3A and relative to direction of production P pass through the respective closing, transfer, release and return sections 17' to 20'.

Figure 4I:
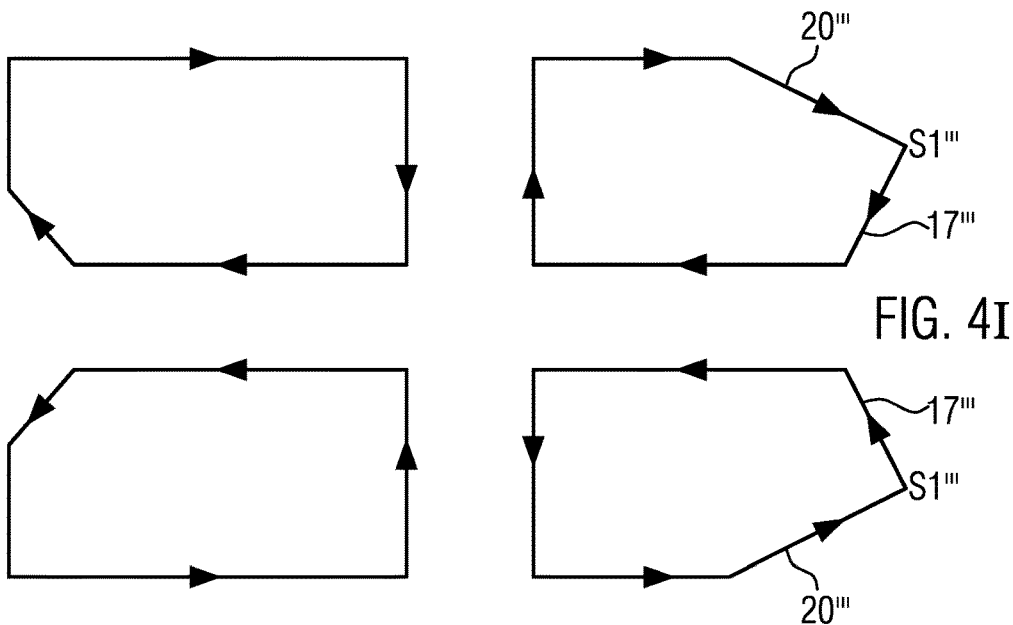
FIG. 4I shows a schematic motion sequence of the embodiment according to FIGS. 4A to 4H.
Figure 4A:
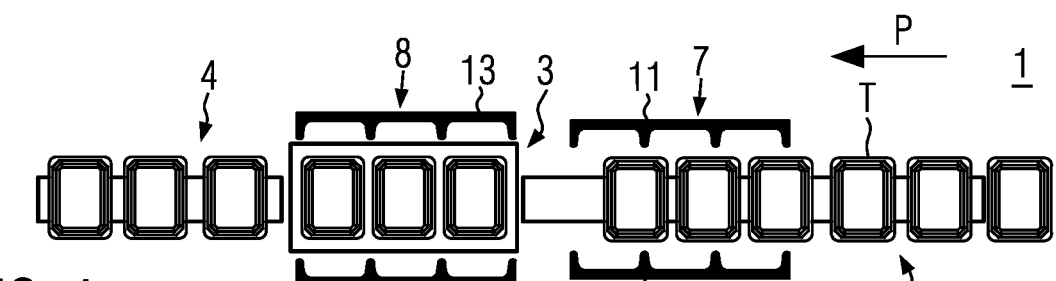
FIGS. 4A to 4H show another embodiment with separate gripper units.

FIGS. 4A to 4H show a gripper device 5 on tray sealing machine 1 with a first and a second gripper unit 7, 8 which are formed separately. FIG. 4A shows that respective tray grippers 11, 12 of first gripper unit 7 are moved closer together than respective tray grippers 13, 14 of second gripper unit 8 are positioned.

Figure 4B:
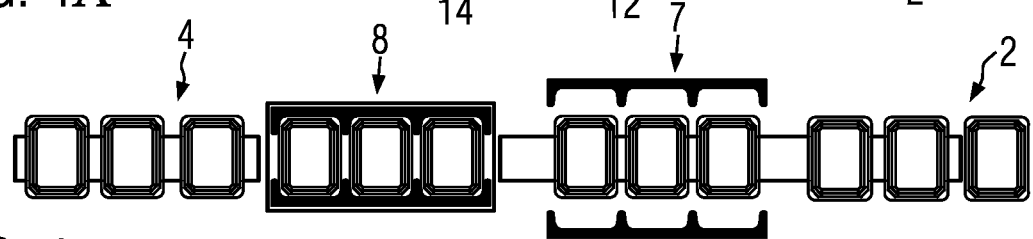

FIG. 4B shows that second gripper unit 8 grips packagings V that are positioned inside sealing station 3 before first gripper unit 7 has closed for gripping trays T at teed unit 2.

Figure 4C:
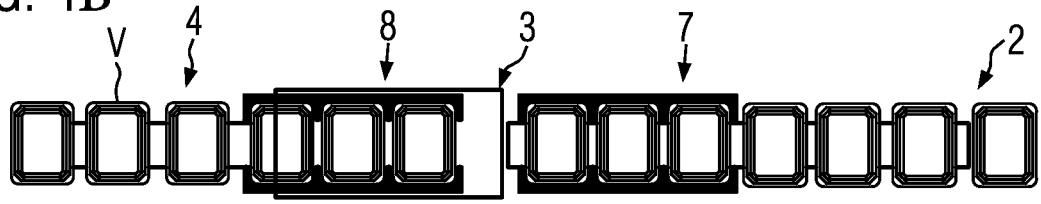

In FIG. 4C, first gripper unit 7 is now also in the closed state, while second gripper unit 8 is already transporting packagings V from sealing station 3 in the direction toward discharge unit 4 positioned downstream.

Figure 4D:
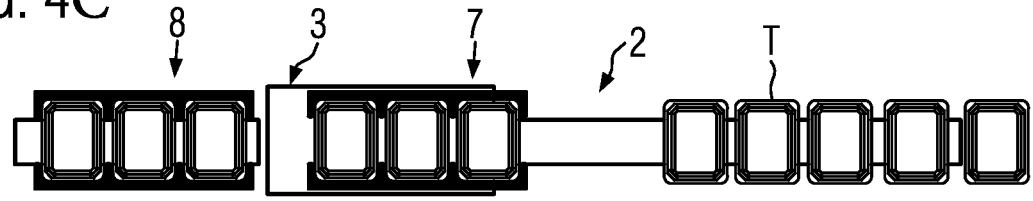

In FIG. 4D, second gripper unit 8 is ready for transfer to deliver packagings V to discharge unit 4. There are trays T taken up on first gripper unit 7 on the way to sealing station 3.

Figure 4E:
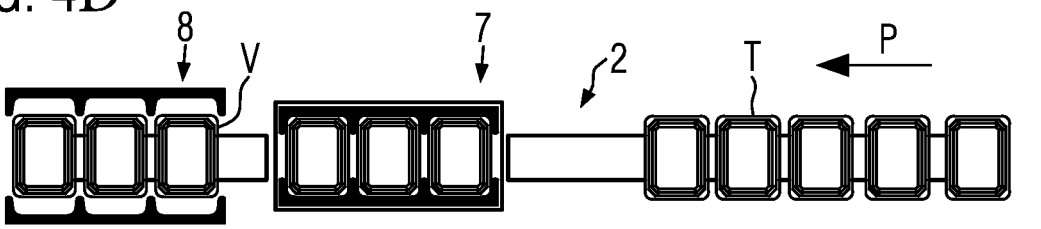
Figure 4F:
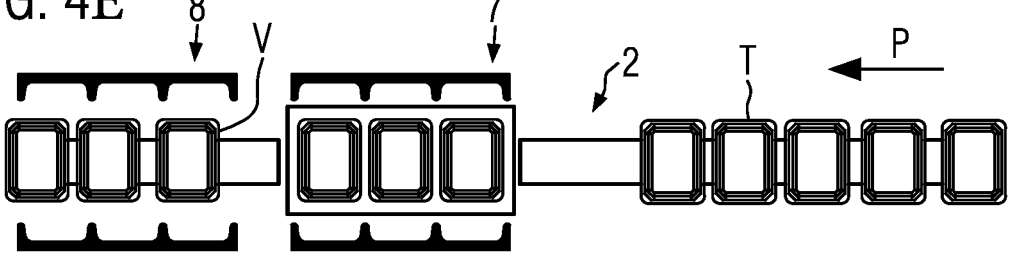
Figure 4G:
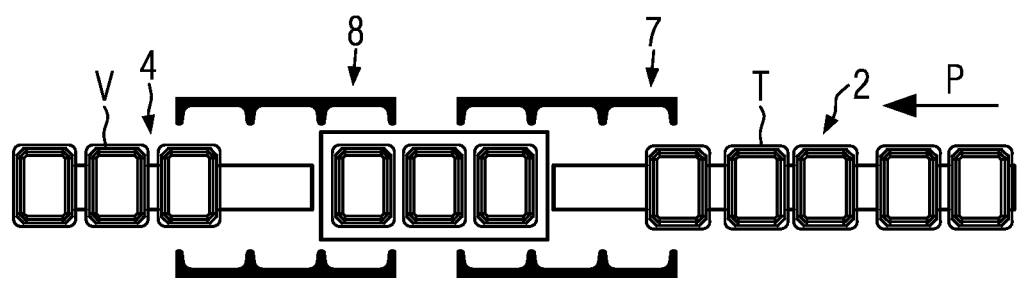

In FIG. 4E, second gripper unit 8 already performs a release motion for delivering packagings V. First gripper unit 7 is now positioned in FIG. 4e in such a manner at sealing station 3 that it can deliver trays T taken up thereon for the subsequent tray sealing process S.

Figure 4H:
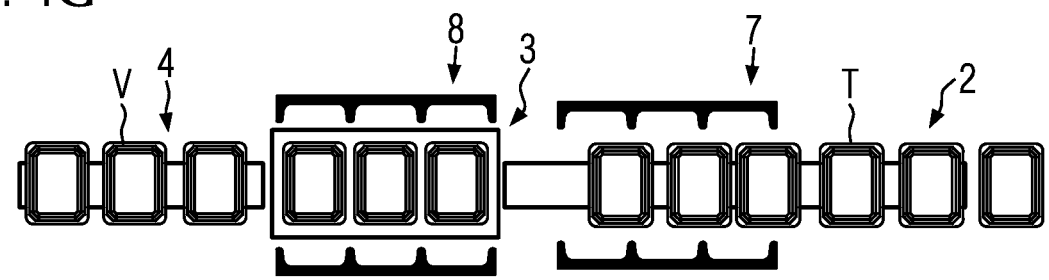

In FIG. 4F, first as well as the second gripper unit 7, 8 are positioned so wide open to perform a subsequent return motion according to FIG. 4F to their starting position according to FIG. 4h, which corresponds to the position in FIG. 4A.

FIG. 4I shows schematic route sequences in relation to direction of production P of respective gripper units 7, 8 according to FIGS. 4A to 4H. With respect to first gripper unit 7 of FIGS. 4A to 4H, tray grippers 11, 12 respectively provided thereon in comparison to the motion sections according to FIG. 3J show shortened return sections 20''' to return first and second tray gripper 11, 12 back to starting position S1''', S2'''.

Figure 5:
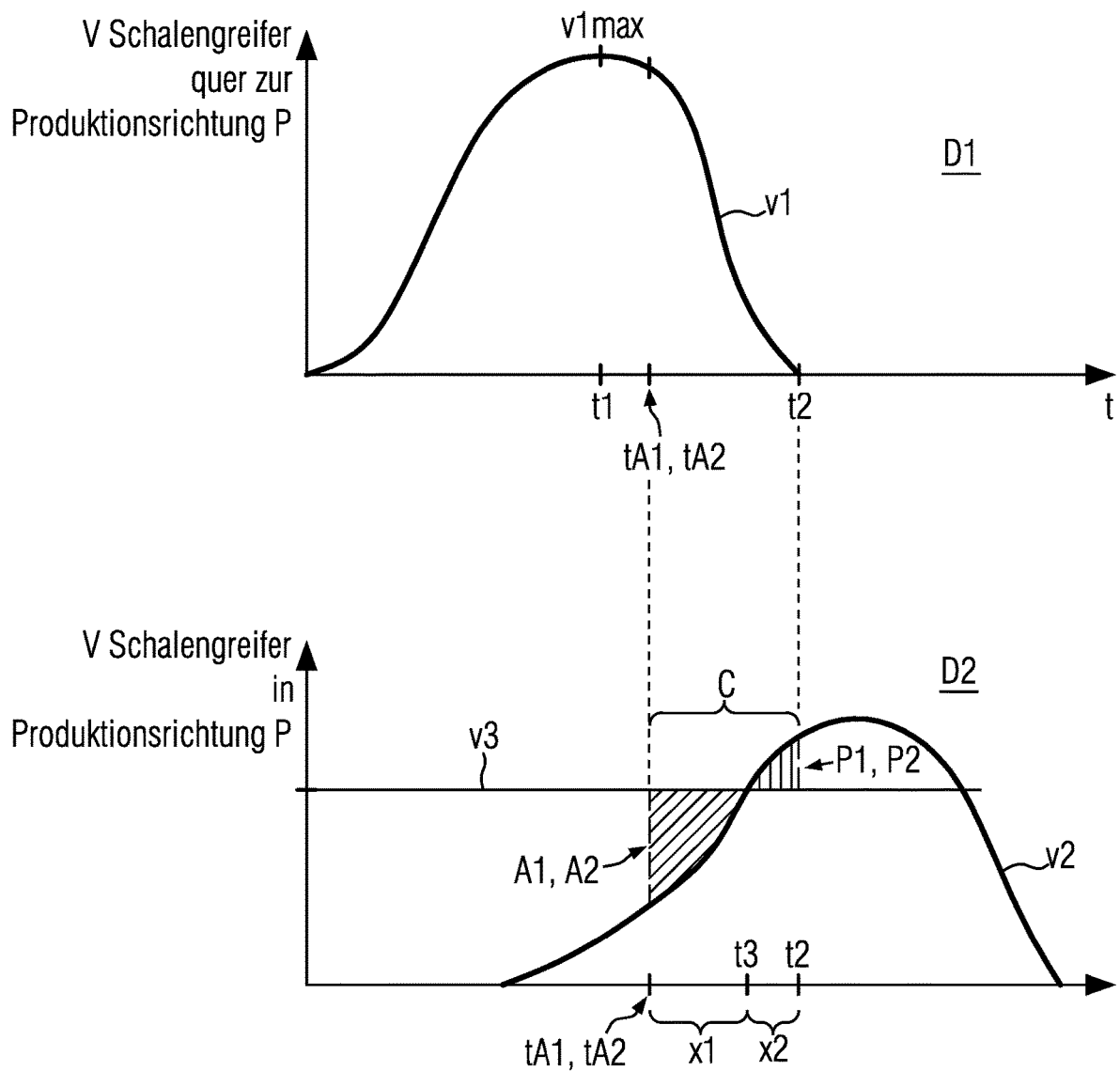
FIG. 5 shows a schematic representation of the respective speed curves of the tray grippers transverse to the direction of production as well as of the tray grippers of the first gripper unit and of the conveyor belt of the feed unit in the direction of production.

FIG. 5 shows in schematic exemplary representation in an upper diagram D1 a speed v1 of first and/or second gripper unit 7, 8 of gripper device 5 transverse to direction of production P. In diagram D1 speed v1 increases continuously up to a maximum speed v1max at point in time t1 and is then continuously decelerated until the tray grippers are at a standstill at point in time t2. At point in time tA1, tA2, the respective pairs of grippers are positioned in their initial position A1, A2 for the immersion motion. At the beginning of the immersion motion, i.e., during a first time interval X1 shown in diagram D2, the respective pairs of tray grippers are closed more quickly transverse to direction of production P than at a second time interval X2 (see diagram D2).

FIG. 5 further shows a bottom diagram D2, in which both a speed v2 of the tray gripper of first and/or second gripper unit 7, 8 as well as a belt speed v3 of conveyor belt 9 of feed unit 2 are each shown in direction of production P.

In FIG. 5, belt speed v3 is constant in bottom diagram D2. In diagram D2, a closing motion C of respective tray grippers 11, 12 of first gripper unit 7 and/or respective tray grippers 13, 14 of second gripper unit 8 takes place during a first time interval X1 and a second time interval X2. Closing motion C begins at a point in time tA1, tA2, i.e., from the respective initial positions A1, A2 of first and/or second gripper unit 7, 8. Within first time interval X1, speed v2 of tray grippers 11, 12, 13, 14 relative to belt speed v3 of conveyor belt 9 of feed unit 2 is slower and from a point in time t3 within second time interval X2 is greater than belt speed V3, so that the respective pairs of tray gripers immerse in respective position windows F1, F2 left free between trays T first during time interval X1 and then during second time interval X2 into respective position window F1, F2. At point in time t2, the respective tray grippers of first and/or second gripper unit 7, 8 have reached respective closing positions P1, P2.

Speed v2 in direction of production P of first and second tray gripper 11, 12 and/or third and fourth tray gripper 13, 14 is accelerated in view of FIG. 5 when respectively performing closing motion C from respective initial position A1, A2 towards respective closing position P1, P2 such that speed v2 of first and second tray gripper 11, 12 and/or of third and fourth tray gripper 13, 14 in direction of production P relative to belt speed v3 of feed unit 2, which is greater than zero, at the beginning of closing motion C, i.e., at the beginning of an immersion motion of gripper fingers 15 into position window F1, during first time interval. X1 is slower than belt speed v3 and during subsequent second time interval X2 until respective closing positions P1, P2 have been reached is greater than belt speed v3, so that respective gripper fingers 15 of first gripper unit 7 and respective gripper fingers 16 of second gripper unit 8, as shown in FIGS. 6a and 6b, immerse along corresponding trajectory sections M, N into respective position windows F1 which are present between trays T provided on feed unit 2, and respective position windows F2 which are present between packagings V positioned within sealing station 3.

FIG. 6 shows first gripper unit 7 relative to trays T conveyed along direction of production P on conveyor belt 9 of feed unit 2. The two trajectory sections M show that faster moving trays T first overtake gripper fingers 15, i.e., during first time interval X1 are moved faster on conveyor belt 9 than tray grippers 11, 12 move in direction of production P. With the simultaneous cross-adjustment of tray grippers 11, 12, it is achieved that gripper tips 21 of gripper fingers 15, which are associated with rear tray corners TE, immerse from there along trajectory sections M into position windows F1 in opposite direction thereto. From a certain immersion depth, i.e., at point in time t3 in diagram D2 of FIG. 5, first gripper unit 7 moves faster in direction of production P than conveyor belt 9, whereby tray grippers 11, 12 can gently take along the trays in direction of production P.

Figure 6A:
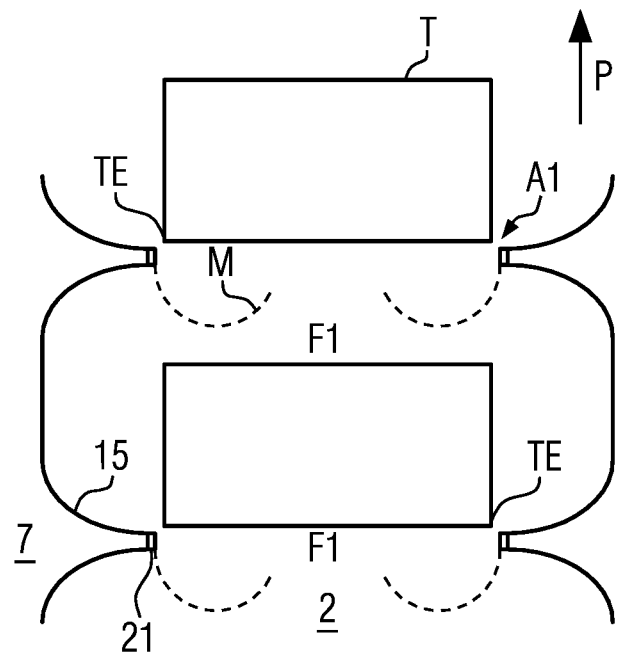
FIG. 6A shows a schematic representation of the immersion trajectory section of gripper finger tips of the first gripper unit into the position windows between the trays provided on the feed unit.
Figure 6B:
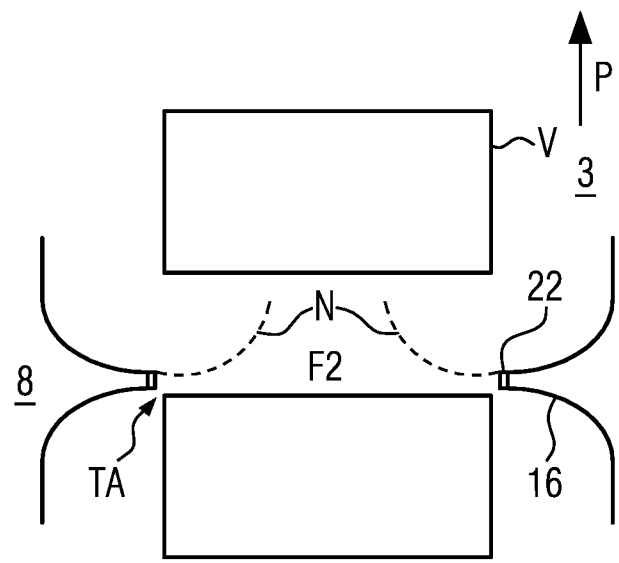
FIG. 6B shows the immersion of gripper finger tips of the second gripper unit within the sealing station into the position windows between the packagings that are standing still.

FIG. 6B shows the immersion of gripper fingers 16 of second gripper unit 8 into a position window F2 which is present between packagings V positioned within sealing station 3. In contrast to FIG. 6A, at point in time tA1, tA2 (see diagram D2 from FIG. 5) gripper tips 22 of gripper fingers 16 of second gripper unit 8, when viewed in direction of production P, are positioned at leading tray corners TA of a packaging V and immerse along trajectory sections N in a leading manner in direction of production into position window F2.

In FIG. 6A, taking up trays T at feed unit 2 by way of first gripper unit 7 is shown schematically. FIG. 6B shows packagings V finished within sealing station 3 being taken up by second gripper unit 8 in schematic representation. The schematic representations shown in FIGS. 6A and 6B can be performed by gripper units 7, 8 coupled to each other or separate gripper units 7, 8.

In direction of production P, gripper fingers 15 of first gripper unit 7 moved close to a rear tray corner TE of tray T begin with closing motion C, i.e., with the immersion process into a front region of position window F1 along trajectory sections M. In FIG. 6b, gripper fingers 16 of second gripper unit 8 begin with the immersion process into position window F2 at leading tray corners TA of packagings V, i.e., when viewed in direction of production P in a rear region of position window F2.

Embodiments of the disclosure enable precise take-up as well as gentle transport of trays T as well as packagings V along the course of production of tray sealing machine 1. The principle of the disclosure can be used on different types of tray sealers. Depending on the tray geometry as well as with regard to desired throughput rates at tray sealing machine 1, respective gripper units 7, 8 can be variably adjustable in their motion sequence. It is also conceivable that belt speed v3 of conveyor belt 9 is not constant, but varies during production operation, for example, to provide a buffer and/or an acceleration function on conveyor belt 9. With a changing belt speed v3, it could be provided that speed v2 of the respective tray grippers in direction of production P is variably adapted thereto in order to optimally adapt the operation of gripper device 5 to the provision of trays T.

What is claimed is:

1. A tray sealing machine, comprising a feed unit for transporting trays in a direction of production, a sealing station in the direction of production downstream of the feed unit for the production of packagings, a discharge unit in the direction of production downstream of the sealing station, and a gripper device which is configured to take up trays provided in a transport cycle at the feed unit and transport them into the sealing station for a tray sealing process therein as well as to take up packagings produced within the sealing station and transport them to the discharge unit, wherein the gripper device comprises a first gripper unit with a first tray gripper and a second tray gripper, wherein the first tray gripper and the second tray gripper are mounted synchronously to each other periodically adjustable along closed trajectories, wherein the first tray gripper and the second tray gripper are configured to perform a closing motion to take up the trays provided by the feed unit, wherein the first tray gripper and the second tray gripper are each adjustable when performing the closing motion from a respective initial position toward a respective closing position, wherein the first tray gripper and the second tray gripper are adjustable toward each other during the closing motion, at least along a predetermined motion section until the closing position has been reached, by way of a motion superimposed both in the direction of production and transverse to the direction of production in order to take up the trays provided at the feed unit, wherein the feed unit is configured to provide the trays on a conveyor belt of the feed unit so that the trays are arranged consecutively in the direction of production at a predetermined distance from each other which defines a respective position window between the trays, wherein the first gripper unit is configured such that a speed of the first tray gripper and the second tray gripper in the direction of production when respectively performing the closing motion from the respective initial position to the respective closing position can be accelerated such that the speed of the first tray gripper and the second tray gripper in the direction of production relative to a belt speed of the feed unit, which is greater than zero, during a predetermined first time interval of the predetermined motion section is slower than the belt speed and during a subsequent predetermined second time interval until the closing position has been reached is greater than the belt speed, so that gripper fingers formed on the first tray gripper and the second tray gripper are immersible into the respective position windows located between the trays provided, each along a predetermined trajectory section.

2. The tray sealing machine according to claim 1, wherein, when performing the closing motion for taking up the trays by way of the first gripper unit, a motion of the first tray gripper and the second tray gripper in the direction of production and transverse to the direction of production as well as an advance motion of the conveyor belt of the feed unit are continuously superimposed.

3. The tray sealing machine according to claim 1, wherein the respective gripper fingers are adjustable during the performance of the closing motion, at least during the first time interval, in a noncontact manner toward the trays along the respective trajectory section within a region of the respective position windows.

4. The tray sealing machine according to claim 1, wherein the respective initial position of the first tray gripper and the second tray gripper is defined such that respective gripper tips of the gripper fingers are movable in the direction of production to a rear tray corner and are positioned in the direction of production at a front of a subsequent position window before the closing motion begins.

5. The tray sealing machine according to claim 1, wherein the gripper device comprises a second gripper unit in the direction of production downstream of the first gripper unit with a third tray gripper and a fourth tray gripper, wherein the third tray gripper and the fourth tray gripper are mounted synchronously to each other periodically adjustable along closed trajectories, wherein the third tray gripper and the fourth tray gripper of the second gripper unit are configured to perform a closing motion for taking up the packagings produced in the sealing station, wherein the third tray gripper and the fourth tray gripper are each adjustable when performing the closing motion from a respective initial position toward a respective closing position.

6. The tray sealing machine according to claim 5, wherein the first gripper unit and the second gripper unit are formed coupled to each other, so that the respective tray grippers are adjustable on common trajectories.

7. The tray sealing machine according to claim 5, wherein the first gripper unit and the second gripper unit are formed as separate gripper units.

8. The tray sealing machine according to claim 5, wherein the third tray gripper and the fourth tray gripper of the second gripper unit are configured to perform a release motion for the release of produced packagings to the discharge unit, wherein the third tray gripper and the fourth tray gripper are adjustable, at least along a motion section during the release motion, by way of a motion superimposed both in the direction of production as well as transverse to the direction of production away from each other in order to transfer the packagings for onward transportation to a conveyor belt of the discharge unit running in the direction of production.

9. The tray sealing machine according to claim 8, wherein, when performing the release motion, the third tray gripper and the fourth tray gripper of the second gripper unit are each adjustable with a motion component in the direction of production which is synchronized with a motion component of the packagings transported away in the direction of production by the discharge unit.

10. The tray sealing machine according to claim 1, wherein the first gripper unit is configured to perform a return motion to the respective initial position, wherein the respective first tray gripper and the respective second tray gripper are adjustable toward each other during the return motion, at least along a motion section until an initial position has been reached, by way of a motion superimposed both against the direction of production as well as transverse to the direction of production.

11. A method for operating a gripper device on a tray sealing machine, where trays from a feed unit are taken up by a first gripper unit and transported into a sealing station for a tray sealing process, wherein, for taking up the trays provided by the feed unit, a first tray gripper and a second tray gripper of the first gripper unit perform a closing motion with which the tray grippers are adjusted from a respective initial position toward a respective closing position, wherein the first tray gripper and the second tray gripper during the closing motion are adjusted toward each other, at least along a predetermined motion section until the closing position has been reached, by way of a motion superimposed both in a direction of production as well as transverse to the direction of production in order to take up the trays provided at the feed unit, wherein the trays are provided on a conveyor belt of the feed unit consecutively in the direction of production at a predetermined distance from each other which defines a respective position window between the trays, wherein a speed in the direction of production of the first tray gripper and the second tray gripper, when respectively performing the closing motion, is accelerated from the respective initial position toward the respective closing position such that the speed of the first tray gripper and the second tray gripper in the direction of production relative to a belt speed of the feed unit, which is greater than zero, during a predetermined first time interval is slower than the belt speed and during a subsequent predetermined second time interval until the closing position has been reached is greater than the belt speed, so that gripper fingers formed on the first tray gripper and the second tray gripper immerse into the respective position windows located between the trays provided, each along a predetermined trajectory section.

12. The method according to claim 11, wherein, when performing the closing motion for taking up the trays by way of the first gripper unit, a motion of the first tray gripper and the second tray gripper in the direction of production and transverse to the direction of production as well as an advance motion of the conveyor belt of the feed unit are continuously superimposed.

13. The method according to claim 11, wherein a second gripper unit in the direction of production downstream of the first gripper unit takes up packagings produced in the sealing station and transfers them to a discharge unit that is in the direction of production downstream of the sealing station, wherein a third tray gripper and a fourth tray gripper of the second gripper unit perform a closing motion for taking up the packagings produced in the sealing station, and wherein the third tray gripper and the fourth tray gripper when performing the closing motion are each adjusted from a respective initial position toward a respective closing position.

14. The method according to claim 13, wherein the first gripper unit and the second gripper unit perform the respective closing motions coupled to each other, so that the third tray gripper and the fourth tray gripper are adjusted toward each other during the closing motion of the second gripper unit, at least along a motion section until the closing position has been reached, by way of a motion superimposed both in the direction of production as well as transverse to the direction of production in order to take up the packagings provided in the sealing station.

15. The method according to claim 13, wherein the third tray gripper and the fourth tray gripper of the second gripper unit are configured to perform a release motion for the release of produced packagings to the discharge unit, wherein the third tray gripper and the fourth tray gripper are adjusted, at least along a motion section during the release motion, by way of a motion superimposed both in the direction of production as well as transverse to the direction of production away from each other in order to transfer the packagings for onward transportation to a conveyor belt of the discharge unit running in the direction of production.

16. The method according to claim 15, wherein, when performing the release motion, the third tray gripper and the fourth tray gripper of the second gripper unit are each adjusted with a motion component in the direction of production which is synchronized with a motion component of the packagings transported away in the direction of production by the discharge unit.

\* \* \* \* \*